US012604922B2

(12) United States Patent　　　(10) Patent No.: US 12,604,922 B2

Cao et al.　　　(45) Date of Patent: Apr. 21, 2026

(54) AQUEOUS COMPOSITION COMPRISING GOS AND HMO

(71) Applicant: FrieslandCampina Nederland B.V., Amersfoort (NL)

(72) Inventors: Linqiu Cao, Wageningen (NL); Harmen Willem Bouma, Wageningen (NL); Henderikus Menno Torringa, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 254 days.

(21) Appl. No.: 18/280,054

(22) PCT Filed: Mar. 8, 2022

(86) PCT No.: PCT/EP2022/055863

§ 371 (c)(1),
(2) Date: Sep. 1, 2023

(87) PCT Pub. No.: WO2022/189417

PCT Pub. Date: Sep. 15, 2022

(65) Prior Publication Data

US 2024/0138457 A1　　May 2, 2024

(30) Foreign Application Priority Data

Mar. 9, 2021　(EP) ..................................... 21161503

(51) Int. Cl.
*A23L 33/125*　　(2016.01)
*A23L 33/00*　　(2016.01)

(52) U.S. Cl.
CPC .............. *A23L 33/125* (2016.08); *A23L 33/40* (2016.08)

(58) Field of Classification Search
CPC ........ A23L 33/40; A23L 33/21; A23L 33/135; A23L 33/125; A23V 2200/3202; A23V 2250/28; A23V 2002/00; A23V 2250/284; A23V 2250/282
USPC .............................. 426/801, 72, 658; 514/5.5
See application file for complete search history.

(56) References Cited

U.S. PATENT DOCUMENTS 6,576,251 B1　6/2003　Stahl
6,756,251 B2　6/2004　Lee 8,703,737 B2 *　4/2014　Buck ........................ A23L 33/40
　　　　　　　　　　　　　　　　　514/54
9,161,563 B2 *　10/2015　Sprenger .............. A61K 31/702
2012/0171166 A1 *　7/2012　Chow ..................... A23L 33/40
　　　　　　　　　　　　　　　　　424/93.4
2016/0339046 A1　11/2016　Chow

FOREIGN PATENT DOCUMENTS

| | | |
|---|---|---|
| CN | 111011864 | 4/2020 |
| CN | 111820284 | 10/2020 |
| CN | 111838683 | 10/2020 |
| EP | 2455387 | 5/2012 |
| JP | 1993140178 | 6/1993 |
| JP | H05140178 A | 6/1993 |
| JP | 2016535724 | 11/2016 |
| JP | 2020531039 | 11/2020 |
| WO | 2014100696 | 6/2014 |
| WO | 2015049331 | 4/2015 |
| WO | 2019043029 | 3/2019 |

OTHER PUBLICATIONS

Van Loo, Jan, et al.; "On the presence of Inulin and Oligofructose as natural ingredients in the western diet"; Critical Reviews in Food Science and Nutrition, vol. 35, No. 6, 1995, pp. 525-552.
Ruiz-Matute, A.I., et al.; "Detection of adulterations of honey with high fructose syrups from inulin by GC analysis"; Journal of Food Composition and Analysis, vol. 23, 2010, pp. 273-276.
"Galacto-oligosaccharides Research"; Functional Foods. vol. 2, Beijing: China Light Industry Press, Sep. 1999, with English translation (7 pgs.).
"Oligosaccharides"; Food Chemistry, Aug. 2013, with English translation (6 pgs.).
International Search Report and Written Opinion, date of mailing Jun. 15, 2022, International Application No. PCT/EP2022-055863 (10 pgs.).
Montagne, D.-H, et al.; "Chapter 9 Infant Formulae-Powders and Liquids", Dairy Powders and Concentrated Products, Jun. 1, 2009, pp. 294-331.

* cited by examiner

*Primary Examiner* — Hong T Yoo

(74) *Attorney, Agent, or Firm* — Fitch, Even, Tabin & Flannery LLP

(57)　　　ABSTRACT

Aqueous oligosaccharide composition having a solids content of 50-80 wt %, 45-100 wt % of said solids consisting of (i) one or more oligosaccharides selected from galacto-oligosaccharides (GOS), fructo-oligosaccharides (FOS), polydextrose (PDX), and combinations thereof, and (ii) one or more human milk oligosaccharides (HMO), wherein the weight ratio of (i) oligosaccharides selected from galacto-oligosaccharides (GOS), fructo-oligosaccharides (FOS), polydextrose (PDX), and combinations thereof to (ii) human milk oligosaccharides is in the range 0.25-600.

14 Claims, No Drawings

AQUEOUS COMPOSITION COMPRISING GOS AND HMO

CROSS REFERENCE TO RELATED APPLICATIONS

This application is a U.S. national phase application of International Application No. PCT/EP2022/055863, filed Mar. 8, 2022, which claims benefit from European Application No. 21161503.4, filed Mar. 9, 2021, which are each hereby incorporated herein by reference in their entirety.

Field

The invention relates a microbially safe and storage stable aqueous composition comprising at least one human milk oligosaccharide (HMO), its preparation and use.

Human milk contains various non-digestible oligosaccharides. These oligosaccharides are a major element in the innate immune system provided by human milk. They serve an important role in the development of a healthy intestinal microbiome by promoting the growth of beneficial microbiota, such as bifidobacteria and lactobacilli, and in the prevention of the adhesion of pathogens and toxins.

The oligosaccharides present in human milk differ from those present in milk from domestic animals, such as cows. More than 100 different oligosaccharides are present in human milk, the most abundantly present ones are fucosylated lactoses such as 2'-fucosyllactose (2'-FL) and 3-fucosyllactose (3-FL), sialylated lactoses such as 3'-sialyllactose (3'-SL) and 6'-sialyllactose (6'-SL), and tetrasaccharides like lacto-N-tetraose (LNT) and lacto-N-neotetraose (LNnT). The most abundantly present human milk oligosaccharide (HMO) is 2'-FL.

The synthesis of HMOs for the purpose of adding them to nutritional compositions, in particular infant formula, is gaining popularity. The synthesis involves conversion of lactose using a microorganism, followed by isolation and purification by conventional methods such as chromatography, nanofiltration, and/or electrodialysis. The resulting product is a syrup containing the HMO, generally containing 25 wt % or more, preferably 25-50 wt % of HMO. In order to reduce microbial contamination, in particular fungal growth, it is important to either concentrate the syrup to a concentration above about 70 wt %, cool it, or transform it into a dry (amorphous or crystalline) material. Such concentration or cooling, however, may cause part of the HMO to crystallize out of the syrup, meaning that such syrups are not storage stable. For this reason, the resulting purified HMO syrups are either subjected to a crystallization step or being dried (e.g. by spray-drying, freeze-drying, or spray-cooling) to form a powder.

Like the human milk oligosaccharides, also galacto-oligosaccharides (GOS) and fructo-oligosaccharides (FOS; which includes inulin) are known to positively affect the human microbiome, of both adults and children.

Various physiological functions of GOS and FOS have been reported, including the capacity to stimulate the growth of bifidogenic bacteria in the gut, to support normal gut transit, to contribute to natural defenses, to enhance mineral absorption, and to stimulate immune functions and lower inflammations.

Within the present document, the term "GOS" or "galacto-oligosaccharides" includes β-GOS, α-GOS, and combinations thereof, although β-GOS is the preferred type of GOS.

GOS, in particular β-GOS, has received particular attention for its prebiotic effects that promote the growth of bifidobacteria, lactobacilli, and other enteric bacteria. Therefore, GOS is commonly used in infant formula, beverages fermented by lactobacilli, yogurts, juices and drinks.

Conventional β-GOS comprises a chain of galactose units and a terminal glucose unit, that arises through consecutive transgalactosylation reactions, catalyzed by a galactosidase, a beta-galactosidase. This results in a mixture of galacto-oligosaccharides with different degrees of polymerization (DP), including lactose. Typical β-GOS preparations mainly comprise di- to hexa-saccharides. Some of the GOS components exist naturally in human breast milk and bovine colostrum.

Beta-galactosidase enzymes that are used for the production of conventional β-GOS are those produced in many microorganisms such as *Bacillus circulans, Aspergillus oryzae, Kluyveromyces marxianus, Kluyveromyces fragilis, Sporobolomyces singularis, Lactobacillus fermentum*, and *Papiliotrema terrestris* (also called *Cryptococcus Papiliotrema terrestris*). Beta-galactosidases differ in their three-dimensional structures, resulting in stereo- and regioselective formation of the glycosidic bonds.

After the enzymatic reaction, β-GOS is isolated and purified using conventional methods, using, e.g., nanofiltration or sequential simulated moving bed (SSMB). The resulting product is a GOS-containing syrup, which can be dried (e.g. by spray-drying, freeze-drying, or spray-cooling) to form a powder if so desired.

Alpha-galactooligosaccharides (α-GOS) occur naturally in various plans, such as peas. Polydextrose (PDX) is a synthetically produced branched polymer of glucose units. Polydextrose is a form of soluble fiber and has shown healthful benefits.

Fructo-oligosaccharides (FOS) comprise a chain of (beta-linked) fructose units with a DP or average DP of 2-250, preferably 2-100, even more preferably 10-60, and most preferably 20-60.

Fructo-oligosaccharides (FOS) belong to the group of fructans, which are linear and branched polymers of fructose, widely found in nature. Fructans are, after starch, the most abundant non-structural natural polysaccharides. Within the present document, the term "FOS" or "fructo-oligosaccharides" include inulin, levan, their oligosaccharide hydrolysis products, and fructo-oligosaccharides obtained by enzymatic trans-fructosylation from sucrose (saccharose).

Inulin occurs naturally in significant amounts in common vegetables and cereals, such chicory, topinambour, onion, and artichoke. The chemical structure of inulin is $(fructose)_n$ or $glucose-(fructose)_n$; indicating n fructose units linked by $\beta(2-1)$-linkages. The average degree of polymerization (DP) can be 2-250, preferably 2-100, even more preferably 10-60, and most preferably 20-60.

Levan-type FOS differs from inulin-type FOS in that the fructose units are $\beta(2-6)$-linked.

Many nutritional compositions, including many formula milks, are prepared by wet blending the ingredients, followed by (spray)drying. Dosing of solid (powdery or crystalline) HMO in a wet blend requires either dosing units not commonly installed in wet blending production plants, or the additional handling step of dissolving the HMO in water. Hence, manufacturers using wet blending desire to obtain oligosaccharides and HMO as a liquid formulation instead of solid material.

Hence, a problem underlying the present invention is the provision of an aqueous composition comprising HMO that is microbially safe and storage stable.

It has now been surprisingly found that this problem can be solved by blending an HMO-containing syrup with a syrup containing GOS, FOS and/or PDX. The resulting aqueous composition has been found to be storage stable. The resulting liquid composition can be easily dosed in a wet blending process. Furthermore, the use of such an aqueous composition is less complicated and more sustainable as it spares crystallization steps and energy intensive drying steps.

The invention therefore relates to an aqueous oligosaccharide composition having a solids content of 50-80 wt %, preferably 70-75 wt %. Of this solids content, 45-100 wt %, preferably 57-95 wt %, consists of:

(i) one or more oligosaccharides selected from galacto-oligosaccharides (GOS), fructo-oligosaccharides (FOS), polydextrose (PDX), and combinations thereof, and (ii) one or more human milk oligosaccharides (HMO), wherein the weight ratio of (i) oligosaccharides selected from galacto-oligosaccharides (GOS), fructo-oligosaccharides (FOS), polydextrose (PDX), and combinations thereof to (ii) human milk oligosaccharides is in the range 0.25-600, preferably 0.25-200, even more preferably 0.5-150, more preferably 1-100, even more preferably 2-50, and most preferably 2-20.

In a preferred embodiment, the one or more oligosaccharides are selected from galacto-oligosaccharides (GOS) and combinations of galacto-oligosaccharides (GOS) with fructo-oligosaccharides (FOS) and/or PDX (polydextrose), even more preferably selected from galacto-oligosaccharides (GOS), and most preferably selected from beta-galacto-oligosaccharides (β-GOS).

In one embodiment, the aqueous composition comprises GOS, preferably β-GOS, in combination with FOS and/or PDX, preferably in combination with FOS. The weight ratio GOS to FOS and/or PDX in the aqueous composition is preferably in the range 0.05-25, more preferably between 1-20, even more preferably 2-20, more preferably 7-12, and most preferably about 9.

GOS is a complex mixture of carbohydrates with differing chain length, linkage type, and degree of branching. GOS preferably comprises 40-100 wt %, more preferably 50-90 wt %, and most preferably 60-80 wt % oligosaccharides (DP 3) on dry weight. GOS may further contain monosaccharides like glucose and galactose, and disaccharides such as lactose, lactulose, and allolactose. The lactose content is generally in the range 0-60 wt %, preferably 0-40 wt %, and most preferably 0-30 wt %; the monosaccharide content is generally in the range 0-10 wt %; based on dry weight. Any weight percentages GOS mentioned in the present document refer to the weight of di- and oligo-saccharides (i.e. DP 2), including lactose, present in said GOS. Mono sugars, e.g. glucose and galactose, are, however, not included.

The same holds for the weight ratios mentioned in the document: for their calculation, mono sugars are not included but all longer sugars present in GOS (i.e. DP 2), including lactose, are taken into account.

The weight ratio of (i) the least one oligosaccharide selected from galacto-oligosaccharides (GOS), fructo-oligosaccharides (FOS), polydextrose (PDX), and combinations thereof to (ii) human milk oligosaccharides is preferably in the range 0.25-600, preferably 0.25-200, even more preferably 0.5-150, more preferably 1-100, even more preferably 2-50, and most preferably 2-20, depending, for instance, on the type of HMO and its concentration in human breast milk.

The human milk oligosaccharide is preferably selected from the group consisting of fucosylated lactoses, sialylated lactoses, tetrasaccharides, and combinations thereof, preferably selected from the group consisting of 2'-fucosyllactose (2'-FL), 3-fucosyllactose (3-FL), 3'-sialyllactose (3'-SL), 6'-sialyllactose (6'-SL), lacto-N-tetraose (LNT), lacto-N-neotetraose (LNnT), and combinations thereof, more preferably being 2'-fucosyllactose (2'-FL) or combination of 2'-FL and one or more additional HMOs, most preferably being 2'-FL.

If the aqueous composition contains 2'-FL, the weight ratio of (i) oligosaccharides selected from galacto-oligosaccharides (GOS), fructo-oligosaccharides (FOS), polydextrose (PDX), and combinations thereof to (ii) 2'-FL is preferably in the range 1-20, preferably 1-7, even more preferably 1-4, most preferably 2-4.

If the aqueous composition contains 3-FL, the weight ratio of (i) oligosaccharides selected from galacto-oligosaccharides (GOS), fructo-oligosaccharides (FOS), polydextrose (PDX), and combinations thereof to (ii) 3-FL is preferably in the range 1-60, preferably 1-20, even more preferably 1-4, most preferably 2-4.

If the aqueous composition contains 3'-SL, the weight ratio of (i) oligosaccharides selected from galacto-oligosaccharides (GOS), fructo-oligosaccharides (FOS), polydextrose (PDX), and combinations thereof to (ii) 3'-SL is preferably in the range 4-400, preferably 7-300.

If the aqueous composition contains 6'-SL, the weight ratio of (i) oligosaccharides selected from galacto-oligosaccharides (GOS), fructo-oligosaccharides (FOS), polydextrose (PDX), and combinations thereof to (ii) 6'-SL is preferably in the range 10-600, preferably 20-160.

If the aqueous composition contains LNT, the weight ratio of (i) oligosaccharides selected from galacto-oligosaccharides (GOS), fructo-oligosaccharides (FOS), polydextrose (PDX), and combinations thereof to (ii) LNT is preferably in the range 1-20, preferably 1-7, even more preferably 1-4, most preferably 2-4.

If the aqueous composition contains LNnT, the weight ratio of (i) oligosaccharides selected from galacto-oligosaccharides (GOS), fructo-oligosaccharides (FOS), polydextrose (PDX), and combinations thereof to (ii LNnT is preferably in the range 1-100, preferably 1-50, even more preferably 1-8, most preferably 2-8.

The aqueous composition according to the present invention preferably has the form of a syrup, more preferably with a viscosity in the range 2500-3000 mPa-s, 2600-2900 mPa-s, more preferably 2650-2850 mPa-s, and most preferably 2700-2800 mPa-s, as determined by using a rotational rheometer in a controlled shear rate mode at 20° C. At this temperature, the viscosity of the composition is generally independent of shear rate.

The aqueous composition preferably has a pH in the range 3.0-4.0, preferably 3.2-3.8, which aids in obtaining microbial stability, which might be obtained by adding an acid, such as citric acid.

The aqueous composition according to the present invention can be prepared by blending a GOS-containing syrup with at least one HMO-containing syrup at a preferred blending temperature of 20-70° C., more preferred 40-60° C., in order to prevent crystallization of the HMO.

The aqueous composition according to the present invention can be suitably used for the preparation of nutritional compositions comprising a combination of HMO and GOS, FOS, and/or PDX. The aqueous composition is particularly suitable for the preparation of nutritional compositions via wet blending.

In a wet blending process for producing formula milk, ingredients are blended together, homogenized, pasteurized, and spray-dried to produce a powdered product. The pasteurization step destroys harmful bacteria that may be present in the ingredients. In contrast to a dry blending process, a wet blending process is much less dependent on the microbiological quality of ingredients. This process also has the advantage of ensuring a uniform distribution of nutrients throughout the batch.

In one embodiment, the aqueous composition according to the present invention is dried, preferably spray-dried, to form a powder comprising both HMO(s) and GOS, FOS and/or PDX. The advantage of first providing an aqueous composition comprising both types of components allows for (i) a homogenized mixture and (ii) only one spray-drying step instead of two—at least one for GOS/FOS/PDX and at least one for the HMO(s)—thereby saving energy and lowing the carbon footprint.

An example of a nutritional composition is formula milk. The formula milk is selected from the group of infant formulas, follow-up formulas and growing-up formulas (also called young child formulas). Other examples of nutritional compositions are compositions for adults, such as patients or frail elderly or anyone else desiring to boost their immune system or gut health.

Infant formula, baby formula or just formula (American English) or baby milk, infant milk or first milk (British English), is a manufactured food designed and marketed for feeding to babies and infants under 12 months of age, usually prepared for bottle-feeding or cup-feeding from powder (mixed with water) or liquid (with or without additional water). The U.S. Federal Food, Drug, and Cosmetic Act (FFDCA) defines infant formula as "a food which purports to be or is represented for special dietary use solely as a food for infants by reason of its simulation of human milk or its suitability as a complete or partial substitute for human milk". Similarly, the *Codex Alimentarius* international food standards (WHO and FAO) defines infant formula as a breast-milk substitute specially manufactured to satisfy, by itself, the nutritional requirements of infants during the first months of life up to the introduction of appropriate complementary feeding. The *Codex Alimentarius* describes the essential composition of an infant formula with amounts and specifications for the lipid source, protein source, carbohydrate source, vitamins and minerals.

In order to constitute the nutritional composition, in particular the formula milk, the aqueous composition according to the present invention or the (spray)dried powder obtained from it is blended with the further ingredients of the nutritional composition. In case of formula milk, these ingredients include at least one protein source, at least one lipid source, vitamins and minerals. Preferably, the aqueous composition is added to a liquid blend of said ingredients.

The lipid source for use in formula milk may be any lipid or fat suitable for use in formula milk. Preferred fat sources include milk fat, safflower oil, egg yolk lipid, canola oil, olive oil, coconut oil, palm kernel oil, soybean oil, fish oil, palm oleic, high oleic sunflower oil and high oleic safflower oil, and microbial fermentation oil containing long-chain, polyunsaturated fatty acids. In one embodiment, anhydrous milk fat is used. The lipid source may also be in the form of fractions derived from these oils such as palm olein, medium chain triglycerides, and esters of fatty acids such as arachidonic acid, linoleic acid, palmitic acid, stearic acid, docosahexaenoic acid, linolenic acid, oleic acid, lauric acid, capric acid, caprylic acid, caproic acid, and the like. Small amounts of oils containing high quantities of preformed arachidonic acid and docosahexaenoic acid such as fish oils or microbial oils may be added. The fat source preferably has a ratio of n-6 to n-3 fatty acids of about 5:1 to about 15:1; for example about 8:1 to about 10:1. In a specific aspect, the infant formula comprises an oil mix comprising palmitic acid esterified to triacylglycerols, for example wherein the palmitic acid esterified in the sn-2 position of triacylglycerol is in the amount from 10% to 60% by weight of total palmitic acid and palmitic acid esterified in the sn-1/sn-3 position of triacylglycerol is in the amount of from 30% to 80% by weight of total palmitic acid.

Examples of protein sources include milk, preferably bovine milk, and a whey protein source selected from whey protein concentrate and serum protein concentrate.

Examples of vitamins and minerals that are preferably present in formula milk are vitamin A, vitamin B1, vitamin B2, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine. Minerals are usually added in salt form.

If necessary, the nutritional composition may contain emulsifiers and stabilisers such as soy lecithin, citric acid esters of mono- and di-glycerides, and the like. It may also contain other substances which may have a beneficial effect such as lactoferrin, nucleotides, nucleosides, probiotics, and the like. Suitable probiotics include Lactobacteria, *Bifidobacterium lactis* such as *Bifidobacterium lactis* Bb12, *Streptococcus thermophilus, Lactobacillus johnsonii* La1, *Bifidobacterium longum* BL999, *Lactobacillus rhamnosus* LPR, *L. rhamnosus* GG, *Lactobacillus reuteri, Lactobacillus salivarius*. Such prebiotics are commercially available.

EXAMPLES

Two Vivinal® GOS syrups were used. The first syrup had a dry matter (DM) content of 50 wt %; the second syrup a dry matter content of 55 wt %.

A 2'-FL syrup with a dry matter content of 30 wt % was used.

The syrups were clear solutions. Based on dry matter, the 2'-FL syrup contained of 96.7% (on Brix) 2'-FL, the 50% DM GOS syrup contained 71.1% (on Brix) GOS and the 55% DM GOS syrup contained of 71.6% (on Brix) GOS (as determined by HPLC; see below).

The syrups were blended in the amounts listed in Table 1. Blending was performed by adding the 2'-FL syrup with a serological pipette to the GOS syrup, while stirring at 50° C.

30 gram samples were taken after all the concentration wisps had disappeared (TO), after 1 hour (T1), and after 2 hours (T2) of blending.

During blending, the pH and Brix stayed the same, as shown in Table 2.

Some blends were concentrated by evaporation to a target concentration of 75% Brix using a rotor evaporator at 50° C., 20 rpm.

As a control, the 50% and 55% GOS syrups and the 2'-FL syrup were evaporated as well using the same settings to a target concentration of 75% Brix.

Upon storage at 20° C. for at least 8 weeks, all these concentrated samples remained clear solutions, except for the 2'-FL syrup, which showed crystallisation. The same observation was done upon storage at 4° C.

The samples were analyzed by HPLC. GOS was quantified by 5 specific GOS peaks from the fingerprint chromatogram. As reference standard, Vivinal® GOS was used in at least 5 different concentrations. A calibration curve for the concentration of GOS versus the total area of the 5 peaks was made and the GOS concentration in the samples was calculated from the total area of the peaks using this calibration curve.

TABLE 1

| Weight ratio GOS:2'-FL | DM 2'-FL syrup | DM GOS syrup | GOS syrup (g) | 2'-FL syrup (g) |
|---|---|---|---|---|
| 02:01 | 30% | 50% | 99.39 | 60.8 |
| 04:01 | 30% | 50% | 122.58 | 37.55 |
| 10:01 | 30% | 50% | 142.65 | 17.45 |
| 20:01 | 30% | 50% | 150.96 | 9.7 |
| 02:01 | 30% | 55% | 95.72 | 64.42 |
| 04:01 | 30% | 55% | 119.88 | 40.33 |
| 10:01 | 30% | 55% | 141.06 | 19.02 |
| 20:01 | 30% | 55% | 149.98 | 10.13 |

TABLE 2

| DM GOS | DM 2'-FL | GOS: 2'-FL | Brix. [%] | | | pH | | |
|---|---|---|---|---|---|---|---|---|
| | | | T0 | T1 | T2 | T0 | T1 | T2 |
| 50% | 30% | 02:01 | 42.7 | 42.8 | 42.7 | 3.15 | 3.18 | 3.19 |
| 50% | 30% | 04:01 | 45.9 | 46.0 | 45.9 | 3.06 | 3.08 | 3.09 |
| 50% | 30% | 10:01 | 48.4 | 48.2 | 48.3 | 3.02 | 3.04 | 3.04 |
| 50% | 30% | 20:01 | 49.5 | 49.5 | 49.5 | 3.01 | 3.02 | 3.01 |
| 55% | 30% | 02:01 | 45.3 | 45.3 | 45.3 | 3.17 | 3.18 | 3.18 |
| 55% | 30% | 04:01 | 49.2 | 49.1 | 49.2 | 3.09 | 3.09 | 3.10 |
| 55% | 30% | 10:01 | 52.6 | 52.5 | 52.5 | 3.02 | 3.03 | 3.04 |
| 55% | 30% | 20:01 | 54.0 | 54.0 | 53.9 | 3.00 | 3.04 | 3.04 |

TABLE 3

| DM GOS Syrup | DM 2'-FL | GOS:2'-FL | Brix prior to evaporation | Brix after evaporation |
|---|---|---|---|---|
| 50% | 0% | 100:0 | 50.7 | 77.4 |
| 55% | 0% | 100:0 | 55.5 | 78.5 |
| 0% | 30% | 0:100 | 32.0 | 74.4 |
| 50% | 30% | 20:01 | 49.5 | 76.7 |
| 55% | 30% | 02:01 | 45.3 | 73.8 |

The invention claimed is:

1. Aqueous oligosaccharide composition having a solids content of 50-80 wt %, 45-100 wt % of said solids consisting of:
   (i) one or more oligosaccharides selected from galacto-oligosaccharides (GOS), fructo-oligosaccharides (FOS), polydextrose (PDX), and combinations thereof, and
   (ii) one or more human milk oligosaccharides (HMO),
   wherein a weight ratio of (i) the oligosaccharides selected from galacto-oligosaccharides (GOS), fructo-oligosaccharides (FOS), polydextrose (PDX), and combinations thereof to (ii) the human milk oligosaccharides is in the range 0.25-600.

2. Aqueous composition according to claim 1 wherein the solids content is 70-75 wt %.

3. Aqueous composition according to claim 1 wherein 57-95 wt % of the solids consists of (i) the one or more oligosaccharides selected from galacto-oligosaccharides (GOS), fructo-oligosaccharides (FOS), polydextrose (PDX), and combinations thereof, and (ii) the one or more human milk oligosaccharides (HMO).

4. Aqueous composition according to claim 1 wherein the weight ratio of (i) the oligosaccharides selected from galacto-oligosaccharides (GOS), fructo-oligosaccharides (FOS), polydextrose (PDX), and combinations thereof to (ii) the human milk oligosaccharides is in the range 0.25-200.

5. Aqueous composition according to claim 1 wherein the human milk oligosaccharide is selected from the group consisting of fucosylated lactoses, sialylated lactoses, tetrasaccharides, and combinations thereof.

6. Aqueous composition according to claim 5 wherein the human milk oligosaccharide is selected from the group consisting of 2'-fucosyllactose (2'-FL), 3-fucosyllactose (3-FL), 3'-sialyllactose (3'-SL), 6'-sialyllactose (6'-SL), lacto-N-tetraose (LNT), lacto-N-neotetraose (LNnT), and combinations thereof.

7. Aqueous composition according to claim 1 wherein the one or more oligosaccharides is selected from galacto-oligosaccharides (GOS) and combinations of galacto-oligo-saccharides (GOS) with fructo-oligosaccharides (FOS) and/or PDX (polydextrose).

8. Aqueous composition according to claim 7 wherein the one or more oligosaccharides is selected from galacto-oligosaccharides (GOS).

9. Aqueous composition according to claim 1 wherein at least one of the HMOs is 2'-FL and the weight ratio of (i) the oligosaccharides selected from galacto-oligosaccharides (GOS), fructo-oligosaccharides (FOS), polydextrose (PDX), and combinations thereof to (ii) 2'-FL is in the range 1-20.

10. Aqueous composition according to claim 1 wherein at least one of the HMOs is 3-FL and the weight ratio of (i) the oligosaccharides selected from galacto-oligosaccharides (GOS), fructo-oligosaccharides (FOS), polydextrose (PDX), and combinations thereof to (ii) 3-FL is in the range 1-60.

11. Aqueous composition according to claim 1 wherein at least one of the HMOs is 3'-SL and the weight ratio of (i) the oligosaccharides selected from galacto-oligosaccharides (GOS), fructo-oligosaccharides (FOS), polydextrose (PDX), and combinations thereof to (ii) 3'-SL is in the range 4-400.

12. Aqueous composition according to claim 1 wherein at least one of the HMOs is 6'-SL and the weight ratio of (i) the oligosaccharides selected from galacto-oligosaccharides (GOS), fructo-oligosaccharides (FOS), polydextrose (PDX), and combinations thereof to (ii) 6'-SL is in the range 10-600.

13. Aqueous composition according to claim 1 wherein at least one of the HMOs is LNT and the weight ratio of (i) the oligosaccharides selected from galacto-oligosaccharides (GOS), fructo-oligosaccharides (FOS), polydextrose (PDX), and combinations thereof to (ii) LNT is in the range 1-20.

14. Aqueous composition according to claim 1 wherein at least one of the HMOs is LNnT and the weight ratio of (i) the oligosaccharides selected from galacto-oligosaccharides (GOS), fructo-oligosaccharides (FOS), polydextrose (PDX), and combinations thereof to (ii) LNnT is in the range 1-100.

\* \* \* \* \*